United States Patent Office 3,091,568
Patented May 28, 1963

3,091,568
THERAPEUTIC PHTHALIMIDINES FOR RELIEVING COUGH AND PRODUCING ANESTHESIA
Oscar Bub, Ludwigshafen (Rhine), Germany, assignor to Knoll A.-G., Ludwigshafen (Rhine), Germany, a company of Germany
No Drawing. Filed May 6, 1960, Ser. No. 27,257
Claims priority, application Germany, May 8, 1959
3 Claims. (Cl. 167—55)

The present invention relates to new and valuable phthalimidine compounds and more particularly to N-basically substituted phthalimidine compounds, and to the process of making and using same.

It is one object of the present invention to provide new and valuable phthalimidine compounds which are substituted at their nitrogen atom by a basically substituted alkyl group and in 3-position by aryl or heterocyclic radicals.

Another object of the present invention is to provide an antitussive drug, which has a considerable spasmolytic activity and, as a result, is of a high broncholytic activity, which does not affect the central nervous system, which has no sedative effect and does not impede respiration.

A further object of the present invention consists in providing a highly effective local anesthetic agent, which can be applied topically as well as by injection.

Still another object of the present invention is to provide a process of making such a new and valuable phthalimidine compound.

A further object of the present invention is to provide a method of relieving coughing, which method does not lead to addiction.

A further object of the present invention is to provide a method of causing local anesthesia.

Other objects of the present invention and advantageous features thereof will become apparent as the description proceeds.

In principle the present invention has for its object to provide derivatives of phthalimidine of the general formula

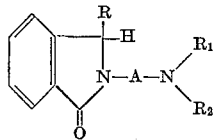

wherein
R represents a phenyl- or a thienyl radical which phenyl radical may be substituted by one or more halogen atoms, the hydroxyl group, lower alkyl radicals, or lower alkoxy groups $R_1$ and $R_2$ represent hydrogen or a lower alkyl radical and $R_1$ and $R_2$, together with the nitrogen atom to which they are attached, also representing a mono-nuclear heterocyclic group such as the pyrrolidino, piperidino, morpholino, piperazino, or N-alkyl piperazino group.

A signifies a lower alkylene radical with 2 to 3 carbon atoms, which radical may be a straight-chain or branched radical.

According to the present invention the new compounds may be prepared in different ways.

They may be obtained by reacting phthalimidines of the general formula

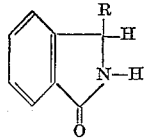

wherein R represents the substituent indicated above, with reactive esters of amino alcohols of the formula

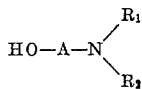

in which A, $R_1$ and $R_2$ have the above mentioned meaning, preferably in the presence of a hydrogen halide-binding agent. Preferably the reaction is carried out in such a manner that first the alkali metal compound of the phthalimidine is prepared with the aid of a suitable basic agent such as an alkali metal hydroxide, alkali metal alcoholate, alkali metal amide, or alkali metal hydride in an inert solvent such as an aromatic hydrocarbon or an ether. The resulting alkali metal compound is reacted with the reactive ester. Especially advantageous is the use of dimethyl formamide as a solvent whereby the reaction takes place in a homogeneous phase under particularly mild conditions.

In place of the reactive esters of amino alcohols, compounds may be used which contain in place of the amino group, a substituent which can be converted into the amino group, such as a halogen atom. When proceeding in this manner the amino group is introduced in a manner known per se after condensation has been completed.

Another manner of preparing the new compounds consists in reacting a substituted benzoic acid of the following formula

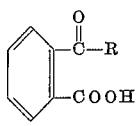

with a diamine of the formula

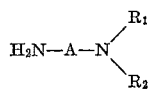

wherein A, R, $R_1$ and $R_2$ represent the same substituents as indicated above and with hydrogen in the presence of a catalytically active metal.

The new compounds may also be prepared by reducing compounds of the following formula

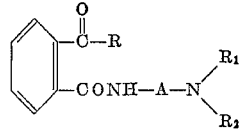

wherein R, A, $R_1$ and $R_2$ represent the same substituents as indicated above, preferably by means of catalytically activated hydrogen.

It is also possible to obtain the new compounds by reducing compounds of the following formula

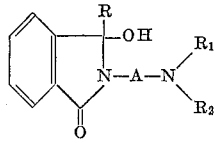

in which R, A, $R_1$ and $R_2$ represent the same substituents as indicated above, preferably by means of catalytically activated hydrogen.

Substituents present in the radical R, may, if necessary, be converted subsequently into other groups. For instance, the hydroxyl group is converted into an alkoxy group, or, vice versa, an alkoxy group is converted into the hydroxyl group.

The compounds prepared according to the present invention may be converted in a manner known per se into the corresponding acid addition salts or into the quaternary ammonium compounds, for instance, by reaction with the respective acids or alkyl or aralkyl halides or dialkyl sulfates.

As stated above the new compounds are useful as remedies because of their local anesthetic, spasmolytic, and pectoral properties.

The following examples serve to illustrate the present invention without, however, limiting the same thereto.

EXAMPLE 1

*2-(2'-Diethylamino Ethyl)-3-Phenyl Phthalimidine*

21 g. of 3-phenyl phthalimidine are suspended in 100 cc. of dimethyl formamide, 4.5 g. of pulverized sodium amide are added under stirring and cooling with ice water. After a quarter of an hour the dark red solution is heated to 60° C. and 16.3 g. of diethylamino ethyl chloride are added dropwise under stirring. Stirring is continued at a temperature of 60–70° C. for one hour. After cooling, the reaction mixture is poured into water and the separated oil is taken up in ether. The ethereal solution is extracted with dilute hydrochloric acid, the base is precipitated by adding dilute sodium hydroxide solution to the aqueous solution. The base is then again taken up in ether. The solution is dried over sodium sulfate and distilled. On recrystallisation of the crystalline residue from petroleum ether, 2-(2'-diethylamino ethyl)-3-phenyl phthalimidine of the melting point 63–64° C. is obtained. Its hydrochloride melts at 156–157° C., on recrystallization from ether.

Its methosulfate of the melting points 168–169° C. (on recrystallization from alcohol and ether) is obtained by reacting the base with dimethyl sulfate in acetic acid ethyl ester.

The following compounds are obtained by following the above described procedure, but using the respective basically substituted alkyl halogenide:

2-(2'-dimethylamino ethyl) - 3 - phenyl phthalimidine. Melting point 99–100° C.
2-(3'-dimethylamino propyl) - 3 - phenyl phthalimidine. Melting point 79–80° C.
2-(2'-dimethylamino propyl) - 3 - phenyl phthalimidine. Melting point 90–91° C.
2-(2'-pyrrolidino ethyl)-3-phenyl phthalimidine. Melting point 112–113° C.
2 - (2'-piperidino ethyl)-3-phenyl phthalimidine. Melting point 125–126° C.
2 - (2'-morpholino ethyl)-3-phenyl phthalimidine. Melting point 149–150° C.

EXAMPLE 2

*2-(3'-N-Methyl Piperazino Propyl)-3-Phthalimidine*

21 g. of 3-phenyl phthalimidine are suspended in 100 cc. of dimethyl formamide. 4.5 g. of pulverized sodium amide are added under stirring and cooling with ice water. As soon as the compound has been dissolved, 19 g. of 1-chloro-3-bromo propane are added dropwise at a temperature of 0° C. within half an hour. The temperature of the reaction mixture is slowly increased to room temperature. After two hours the mixture is poured into water. The precipitated compound is filtered off by suction and is washed with water. 8 g. of unreacted starting material crystallize and are filtered off. The alcohol mother liquor is concentrated by evaporation and the residue is recrystallized from a small amount of acetic acid ethyl ester. 12 g. of crude 2-(3'-chloro propyl)-3-phenyl phthalimidine of the melting point 102–103° C. are obtained which are dissolved in 50 cc. of acetone. After adding 8 g. of anhydrous potassium carbonate and 8 g. of N-methyl piperazine, the solution is boiled under reflux for 12 hours. Thereafter, the acetone solution is filtered and the solvent is distilled off. The residue is taken up in ether and extracted with diluted hydrochloric acid. The base is precipitated by the addition of a dilute sodium hydroxide solution to the aqueous solution and is again dissolved in ether. After drying and distilling off the solvent, 2-(3'-N-methyl piperazino propyl)-3-phenyl phthalimidine of the melting point 122–123° C. (from cyclohexane) is obtained.

EXAMPLE 3

*2-(2'-Diethylamino Ethyl)-3-Phenyl Phthalimidine*

10.5 g. of 3-phenyl phthalimidine and 2.2 g. of pulverized sodium amide are boiled under reflux for one hour in 50 cc. of xylene. Within 15 minutes 8.3 g. of diethylamino ethylchloride are added dropwise at boiling temperature and the mixture is then boiled under reflux for another two hours. After cooling, the xylene solution is extracted with dilute hydrochloric acid. The base is precipitated by the addition of dilute sodium hydroxide solution to the aqueous solution and is taken up in ether. The ethereal solution is dried over sodium sulfate and the solvent is distilled off. A viscous oil of the boiling point 190–195° C./1 mm. Hg is obtained which crystallizes on standing. It is recrystallized from petroleum ether and 2-(2'-diethylamino ethyl)-3-phenyl phthalimidine of the melting point 63–64° C. is obtained.

EXAMPLE 4

*2-(2'-Diethylamino Ethyl)-3-Phenyl Phthalimidine*

10.5 g. of 3-phenyl phthalimidine and 7 g. of anhydrous potassium carbonate are heated to boiling temperature in 50 cc. of dimethyl formamide. At boiling temperature 8.3 g. of diethylamino ethylchloride are added within 15 minutes. The mixture is kept boiling under reflux for two hours. The reaction mixture is poured into water and acidified by the addition of dilute hydrochloric acid whereby 4 g. of unreacted starting material are precipitated. The precipitate is removed by filtration. The base is precipitated by the addition of sodium hydroxide solution and the reaction mixture is worked up as described in Example 3. 2-(2'-diethylamino-ethyl) - 3 - phenyl phthalimidine of the melting point 63–64° C. are obtained.

EXAMPLE 5

*2-(2'-Diethylamino Ethyl)-3-(4'''-Methyl Phenyl) Phthalimidine*

By following the procedure described in Example 1, 23.5 g. of 3-(4'-methyl phenyl) phthalimidine are reacted with 4.5 g. of sodium amide and 16.3 g. of diethylamino ethylchloride in 100 cc. of dimethyl formamide. 2-(2'-diethylamino ethyl)-3-(4'''-methyl phenyl) phthalimidine of the boiling point 160–162° C./0.01 mm. Hg is obtained. Its picrate melts at 146–147° C. (from ethanol).

3-(4'-methyl phenyl) phthalimidine (melting point 214° C. is prepared in a manner similar to that described for preparation of 3-phenyl phthalimidine by R. E. Rose, J. Am. Chem. Soc., vol. 33, p. 390 (1911), by reacting p-toluyl benzoic acid with hydroxylamine to form 6-oxo-3-(4'-methyl phenyl)-4,5-benzo - 1,2 - oxazine (melting point 163° C.) and reduction of said compound with zinc in glacial acetic acid.

EXAMPLE 6

*2-(2'-Diethylamino Ethyl)-3-(4'''-Methoxy Phenyl) Phthalimidine*

By following the procedure described in Example 1, 24 g. of 3-(4'-methoxy phenyl) phthalimidine are reacted with 4.5 g. of sodium amide and 16.3 g. of diethylamino ethylchloride in 100 cc. of dimethyl formamide. 2-(2'-diethylamino ethyl) - 3-(4'' - methoxy phenyl) phthalimidine of the boiling point 190-192° C./0.05 mm. Hg is obtained. Its picrate melts at 128° C. (from ethanol).

On boiling this compound for two hours in concentrated hydrobromic acid, 2-(2'-diethylamino ethyl)-3-(4''-hydroxy phenyl) phthalimidine of the melting point 158–159° C. (from acetic acid ethyl ester) is obtained.

3-(4'-methoxy phenyl) phthalimidine (melting point 167° C.) is prepared by reacting p-anisoyl benzoic acid with hydroxylamine to form 6-oxo-3-(4'-methoxy phenyl)-4,5-benzo-1,2-oxazine (melting point 119–120° C.) and reducing said compound with zinc in glacial acetic acid.

EXAMPLE 7

2-(2'-Diethylamino Ethyl)-3-(4''-Chloro Phenyl) Phthalimidine

By following the procedure described in Example 1, 24.5 g. of 3-(4'-chloro phenyl) phthalimidine are reacted with 4.5 g. of sodium amide and 16.3 g. of diethylamino ethylchloride in 100 cc. of dimethyl formamide. 2-(2'-diethylamino ethyl)-3-(4''-chloro phenyl) phthalimidine of the boiling point 183–185° C./0.01 mm. Hg is obtained. Its picrate melts at 149° C. (from ethanol).

3-(4'-chloro phenyl) phthalimidine (melting point 211° C.) is prepared by reacting 4-chloro benzoyl benzoic acid with hydroxylamine to form 6-oxo-3-(4'-chloro phenyl)-4,5-benzo-1,2-oxazine (melting point 187–188° C.) and reducing said compound with zinc in glacial acetic acid.

EXAMPLE 8

2-(2'-Diethylamino Ethyl)-3-(2''-Chloro-5''-Methyl Phenyl) Phthalimidine

By following the procedure described in Example 1, 25.7 g. of 3-(2'-chloro-5'-methyl phenyl) phthalimidine are reacted with 4.5 g. of sodium amide and 16.3 g. of diethylamino ethylchloride in 100 cc. of dimethyl formamide. 2-(2'-diethylamino ethyl)-3-(2''-chloro-5''-methyl phenyl) phthalimidine of the boiling point 186–187° C. (from ethanol).

3-(2'-chloro-5'-methyl phenyl) phthalimidine (melting point 182–183° C.) is prepared by reacting 2'-chloro-5'-methyl benzoyl benzoic acid with hydroxylamine to form 6 - oxo - 3 - (2'-chloro - 5'-methyl phenyl)-4,5-benzo-1,2-oxazine (melting point 137–138° C.) and reducing said compound with zinc in glacial acetic acid.

EXAMPLE 9

2-(2'-Diethylamino Ethyl)-3-Thienyl Phthalimidine

By following the procedure described in Example 1, 11 g. of 3-thienyl phthalimidine are reacted with 2.2 g. of sodium amide and 8.3 g. of diethylamino ethylchloride in 80 cc. of dimethyl formamide. 2-(2'-diethylamino ethyl)-3-thienyl phthalimidine of the melting point 81–82° C. (from ligroine) is obtained.

3-thienyl-phthalimidine (melting point 212–213° C.) is prepared by reacting thenoyl benzoic acid with hydroxylamine to form 6 - oxo - 3 - thienyl-4,5-benzo-1,2-oxazine (melting point 138–139° C.) and reducing said compound with zinc in glacial acetic acid.

EXAMPLE 10

2-(2'-Diethylamino Ethyl)-3-Phenyl Phthalimidine 226 g. of 2-benzoyl benzoic acid and 140 g. of diethylamino ethylamine are dissolved in 500 cc. of alcohol and treated with hydrogen for twelve hours in an autoclave with 20 g. of Raney nickel at a temperature of 100° C. and a hydrogen pressure of 120 atmospheres. After cooling, the alcoholic solution is separated from the catalyst by filtration and the solvent is distilled off. The residue is taken up in ether, the ethereal solution is shaken several times with dilute hydrochloric acid. The base is precipitated by the addition of dilute sodium hydroxide solution to the aqueous acid solution and is again dissolved in ether. After drying over sodium sulfate the ether is distilled off and the residue is distilled in a vacuum. The main fraction distilling between 185° C. and 195° C. under a pressure of 1 mm., crystallizes on standing. On recrystallization from petroleum ether 2-(2'-diethylamino ethyl)-3-phenyl phthalimidine of the melting point 62–64° C. is obtained.

EXAMPLE 11

2-(2'-Diethylamino Ethyl)-3-Phenyl Phthalimidine 16 g. of 2-benzoyl-benzoic acid-2'-diethylamino ethylamide are dissolved in 100 cc. of glacial acetic acid. The solution is treated with hydrogen under atmospheric pressure after the addition of 10 cc. of concentrated hydrochloric acid and 0.2 g. of platinum oxide. After three hours absorption of hydrogen ceases. The solution is separated from the catalyst by filtration and is diluted with water. The separated oil is taken up in ether. The ethereal solution is neutralized by washing with a dilute solution of sodium bicarbonate and is dried over sodium sulfate. The solvent is distilled off and the residue is recrystallized from petroleum ether. 2-(2'-diethylamino ethyl)-3-phenyl phthalimidine of the melting point 63–64° C. is obtained.

2-benzoyl benzoic acid-2'-diethylamino ethylamide is obtained by reacting 2-benzoyl benzoic acid chloride with dimethylamino ethylamine in benzene solution. Boiling point: 180–185° C./0.01 mm. Hg; hydrochloride, melting point: 190–191° C.

In place of 3-phenyl phthalimidine, 3-(4'-methyl phenyl) phthalimidine, 3-(4'-methoxy phenyl) phthalimidine, 3-(4'-chloro phenyl) phthalimidine, and 3-(2'-chloro-5'-methyl phenyl) phthalimidine as used as starting materials in the preceding examples, there may be employed other 3-aryl phthalimidines, such as 3-(2',4'-dimethyl phenyl) phthalimidine, 3-(2',6'-dimethyl phenyl) phthalimidine, 3-(2',4'-dichloro phenyl) phthalimidine, 3-(2'-bromo phenyl) phthalimidine, 3-(4'-ethoxy phenyl) phthalimidine, and the like, while otherwise the procedure is the same as described in said examples.

As stated hereinabove the new compounds have valuable pharmaceutical properties. An especially valuable compound is the 2-(2'-diethylamino ethyl)-3-phenyl phthalimidine obtained, for instance, according to Example 1. This compound has a surprisingly high antitussive activity. As it has also a considerable spasmolytic activity, it has the great advantage that it causes broncholysis. It does not affect the central nervous system and, as a result thereof, does not have a sedative effect and does not impede respiration. Its antitussive activity is stronger than that of codeine and, in contrast thereto and to other antitussive opiates, it is not habit forming, and does not cause addiction. Other 2-(di-lower alkylamino lower alkyl)-3-phenyl phthalimidines have a similar antitussive activity although not as pronounced as that of 2-(2'-diethylamino ethyl)-3-phenyl phthalimidine.

The 2-(2'-piperidino ethyl)-3-phenyl phthalimidine prepared, for instance, according to Example 1 differs from the 2-(di-lower alkylamino alkyl)-3-phenyl phthalimidines by its surprising local anesthetic effect. It can advantageously be used for surface anesthesia or for regional anesthesia.

The 2-(di-lower alkylamino alkyl)-3-phthalimidines and especially the 2-(2'-diethylamino ethyl)-3-phenyl phthalimidine is preferably administered orally or by inhalation. As composition adapted for inhalation there is used, for instance, an 0.5% to 2.0% aqueous solution of the hydrochloride of 2-(2'-diethylamino ethyl)-3-phenyl phthalimidine which solution has been rendered isotonic by the addition of sodium chloride. Tablets, pills, dragees, lozenges, or other shaped solid preparations of the hydrochloride or phosphate of 2-(2'-diethylamino ethyl)-3-phenyl phthalimidine are used, for instance, for oral administration. Such solid preparations or powders enclosed by gelatin and the like capsules contain, per dosage unit, 15 mg. to 50 mg. of the active agent.

While the preferred daily dose is between about 40 mg. and about 100 mg. subdivided in three to four single doses given every 3 hours to 6 hours, said compound has also been effective in a dose between 10 mg. and 120 mg. per day in the treatment of some patients. A minimm dose of 10 mg. per day, however, is usually required to produce the desired antitussive effect.

With a daily dose between about 10 mg. and about 120 mg. and a preferred daily dose between about 40 mg. and about 100 mg. no disagreeable or toxic side-effects were observed.

Preferably, the antitussive agent according to the present invention is administered perorally in a pharmaceutical carrier in standard form as tablets, pills, lozenges, dragees, and the like shaped and/or compressed preparations. It is also possible to produce emulsions or suspensions of said compound in water or aqueous media such as unsweetened fruit juices and by means of suitable emulsifying or dispersing agents. The new antitussive agents may furthermore be employed in the form of powders, filled into gelatin capsules or the like.

Such powders and mixtures to be used in the preparation of tablets and other shaped and/or compressed preparations may be diluted by mixing and milling with a solid pulverulent extending agent to the desired degree of fineness or by impregnating the already milled, finely powdered, solid carrier with a suspension of the antitussive agent in water or with a solution thereof in an organtic solvent, such as ethanol, methanol, acetone, and others and then removing the water or solvent.

When preparing tablets, pills, dragees, and the like shaped and/or compressed preparations, the commonly used diluting, binding, and disintegrating agents, lubricants, and other tableting adjuvants are employed, provided they are compatible with the new antitussive agents. Such diluting agents and other excipients are, for instance, sugar, lactose, levulose, starch, bolus alba, as disintegrating and binding agents gelatin, gum arabic, yeast extract, agar, tragacanth methyl cellulose, pectin, and as lubricants stearic acid, talc, magnesium stearate, and others.

It is, of course, also possible to administer the new antitussive agents in the form of suppositories whereby the commonly used suppository vehicles, such as cocoa butter are used.

The following examples of compositions containing the new antitussive agents as they are to be used in therapy serve to illustrate the present invention without, however, limiting the same thereto.

EXAMPLE 12

50 g. of 2-(2'-diethylamino ethyl)-3-phenyl phthalimidine hydrochloride are intimately mixed with 150 g. of corn starch and the mixture is granulated and dried in an air current. 45 g. of talcum and 5 g. of stearic acid are added to said granulated mixture and the resulting mass is tableted to 1000 tablets, each containing about 50 mg. of the antitussive agent.

EXAMPLE 13

Cores of dragees with convex surfaces and composed of 25 mg. of 2-(2'-diethylamino ethyl)-3-phenyl phthalimidine hydrochloride, 150 mg. of potato starch, and 15 mg. of stearic acid are prepared in a suitable tableting machine. Said cores are then provided with several sugar coatings in a dragee coating vessel by means of a sugar sirup solution.

EXAMPLE 14

25 mg. of finely comminuted 2-(2'-diethylamino ethyl)-3-phenyl phthalimidine hydrochloride are intimately mixed with 75 mg. of lactose and filled into gelatin capsules.

EXAMPLE 15

The finely pulverized 2-(2'-diethylamino ethyl)-3-phenyl phthalimidine hydrochloride are intimately mixed with a molten suppository vehicle of a fatty acid ester base or a polyethylene glycol base. The mixture is then poured into a suppository mold and solidified. The content of antitussive agent is adjusted in such a manner that each suppository contains 25 mg. thereof.

EXAMPLE 16

As stated above, the local anesthetic agent is administered in the form of an aqueous solution of 2-(2'-piperidino ethyl)-3-phenyl phthalimidine hydrochloride which is prepared by dissolving 0.5 g. of 2-(2'-piperidino ethyl)-3-phenyl phthalimidine hydrochloride in such an amount of an aqueous isotonic sodium chloride solution containing 0.8% of sodim chloride and 0.002% of adrenaline that a volume of 100 cc. is obtained. 1 cc. of said solution contains 5 mg. of the local anesthetic agent.

In place of the hydrochlorides or phosphates of the phthalimidine compounds according to the present invention, acid addition salts with other acids, such as inorganic acids, for instance, hydrobromic acid, nitric acid, sulfuric acid, and the like or organic acids, such as acetic acid, propionic acid, succinic acid, citric acid, tartaric acid, malonic acid, malic acid, benzoic acid, salicylic acid, phthalic acid, isonicotinic acid, furoic acid, and others may be prepared by methods known to the art.

Of course, many changes and variations in the reactants, the reaction conditions, temperature, duration, the solvents employed, the methods of working up the reaction mixture and of isolating and purifying the phthalimidine compounds according to the present invention, the composition of the pharmaceutical preparations administered, the methods of administration, and the like may be made by those skilled in the art in accordance with the principles set forth herein and in the claims annexed hereto.

I claim:

1. In a process of relieving cough, the step which comprises orally administering to a patient suffering from cough between about 10 mg. and about 120 mg. of the compound selected from the group consisting of 2-(2'-diethylamino ethyl)-3-phenyl phthalimidine and its pharmaceutically acceptable acid addition salts.

2. In a process of relieving cough, the step which comprises administering by inhalation to a patient suffering from cough the compound selected from the group consisting of 2-(2'-diethylamino ethyl)-3-phenyl phthalimidine and its pharmaceutically acceptable acid addition salts.

3. In a process of causing local anesthesia, the step which comprises administering to a patient to be locally anesthetized the compound selected from the group consisting of 2-(2'-piperidino ethyl)-3-phenyl phthalimidine and its pharmaceutically acceptable acid addition salts.

References Cited in the file of this patent

UNITED STATES PATENTS

| | | |
|---|---|---|
| 2,841,591 | Prichard | July 1, 1958 |
| 2,957,872 | Huebner | Oct. 25, 1960 |
| 2,960,439 | Settlage | Nov. 15, 1960 |